United States Patent [19]

Scheindel

[11] Patent Number: 4,892,171

[45] Date of Patent: Jan. 9, 1990

[54] ADAPTER FOR USE WITH A LUBRICATION FITTING

[76] Inventor: Christian T. Scheindel, Star Route Ridge Rd., Randolph Center, Vt. 05061

[21] Appl. No.: 242,641

[22] Filed: Sep. 12, 1988

[51] Int. Cl.$^4$ ............................................. F01M 11/04
[52] U.S. Cl. ............................... 184/105.3; 184/105.1; 184/105.2
[58] Field of Search ................. 184/105.1, 105.2, 105.3

[56] References Cited

U.S. PATENT DOCUMENTS

| 16,650 | 6/1927 | Houghton | 184/105.3 |
|---|---|---|---|
| 653,728 | 7/1900 | Burkitt | 184/105.3 |
| 1,345,571 | 7/1920 | Yates | 184/105.3 |
| 1,383,306 | 7/1921 | Jacques | 184/105.3 |
| 1,551,261 | 8/1925 | Milner | 184/105.3 |
| 1,580,618 | 4/1926 | Lovequist et al. | 184/105.3 |
| 1,637,325 | 7/1927 | Jacques | 184/105.3 |
| 1,740,297 | 12/1929 | Gibson | 184/105.3 |
| 2,055,603 | 9/1936 | Dodge | 184/105.3 |
| 2,087,085 | 7/1937 | Davis | 184/105.3 |
| 2,362,880 | 11/1944 | Campbell | 184/105.1 |
| 2,546,475 | 3/1951 | Rizzo et al. | 184/105.3 |
| 4,595,080 | 6/1986 | Shay | 184/105.3 |

FOREIGN PATENT DOCUMENTS

| 567233 | 2/1924 | France | 184/105.2 |
|---|---|---|---|
| 748626 | 7/1933 | France | 184/105.1 |
| 178415 | 3/1962 | Sweden | 184/105.1 |

Primary Examiner—Henry A. Bennet
Assistant Examiner—Denise L. Ferensic

[57] ABSTRACT

There is disclosed an adapter for use with a lubrication fitting of the type which includes a flow restrictor normally biased to a closed position to restrict the flow of fluid, the adapter comprising a generally tubular body having a top end and a bottom end, the top end of the tubular body being shaped and dimensioned to removably receive the output port of the lubrication fitting and a pin centrally positioned in the tubular body proximate the top end thereof, the pin being adapted to enter an opening of the lubrication fitting to move the flow restrictor from its normally closed position to an open position in which fluid can flow. The disclosed adapter is featured in that the diameter of the pin is smaller than the diameter of the opening of the lubrication fitting, and in that the pin is fixed to a separating disc which is mounted to the tubular body and is provided with a plurality of openings for allowing the fluid to flow into the lubrication fitting.

12 Claims, 2 Drawing Sheets

ADAPTER FOR USE WITH A LUBRICATION FITTING

The present invention relates to an adapter for use with a lubrication fitting according to the preamble of claim 1.

An adapter of this type is known from US-A-No. 1,637,325. This known adapter is for use with a lubrication fitting of the type which includes a flow restrictor in the form of a ball normally biased to a closed position to restrict the flow of fluid which in most cases is a grease for the greasing of bearings. The adapter comprises a generally tubular body having a top end and a bottom end, the bottom end being connected to a flexible hose by which the grease is supplied. The top end of said tubular body is shaped and dimensioned to removably receive the output port of the lubrication fitting by means of an elastic packing which is sealing the lubrication fitting.

In order to move the flow restrictor ball from its normally closed position to an open position in which fluid can flow, there is provided a pin centrally positioned in the tubular body and being adapted to enter an opening of said lubrication fitting by its top end. The top end of the pin is flattened in such an extent that it is engaging the periphery of the opening, thereby defining the distance which the flow restrictor ball is moved. As the relative position between the adapter and the lubrication fitting is not constant due to the elastic packing, the pin must be supported movably, being pressed against the flow restrictor ball by means of a helical spring.

This known adapter therefore has a rather complicated structure which, consequently, brings about great production costs. Moreover, the movable support of the central pin cannot withstand to great lateral forces which are likely to occur when the adapter is unexactly put onto the lubrication fitting. Hence, the tip can be pulled out, so that this known adapter has no sufficient ruggedness.

It is the object of the present invention to provide an adapter according to the preamble of claim 1 which is cheap in production and at the same time is distinguished by an excellent ruggedness.

According to the present invention this object is solved by the advantageous measures as indicated in the characterizing portion of claim 1.

Hence, according to the present invention, the diameter of the pin is smaller than the diameter of the opening of the lubrication fitting, whereby the pin is fixed to a separating disc which is mounted to the tubular body and is provided with a plurality of openings for allowing the fluid to flow into the lubricationfitting. Due to these advantageous measures the pin does not have to be movably supported, so that it is able to withstand great lateral forces, the adapter having an excellent ruggedness. Moreover, the adapter has a rather simple construction which results in very low production costs.

The ruggedness of the adapter can even by enlarged by rounding the top end of the pin, as is indicated in claim 2. This is because the lateral forces during the putting on of the adapter are reduced by the rounded top end.

According to the advantageous development as indicated in claim 3 it is possible to form an annular shoulder between the top end and the separating disc of the tubular body, the dimension and the slope of the shoulder being such that it prevents the fluid from flowing past the lubrication fitting. Additionally this shoulder acts as a stop defining the distance which the flow restrictor is moved.

According to the advantageous developments as indicated in claims 4 to 6 it is possible to shape and design the top end of the tubular body such that is can receive a ball-shaped head of the lubrication fitting while allowing a restricted angular movement between the lubrication fitting and the tubular body. It moreover is possible to design the tubular body such that the ball-shaped head of the lubrication fitting is received in a snap-fit manner. In this case it is advantageous that the top end of the tubular body includes an angle stop proximate the top end to limit angular movement of the adapter and the lubrication fitting. By this the danger of breaking the pin is still reduced.

In case of supplying the fluid by means of a dispensating apparatus it is advantageous according to claim 10 to provide an annular projection on the bottom end of the tubular body which is capable of acting as a stop to restrict motion of the adapter when it is connected to the dispensating apparatus.

Advantageous dimensions of the adapter according to the present invention are indicated in claims 7 to 9.

In the following the present invention will be described in more detail by way of two preferred embodiments with reference to the accompanying drawings, in which.

Figure 1:
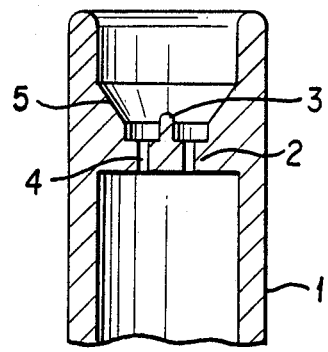
FIG. 1 is a sectional view of a first embodiment of the adapter.
Figure 4:
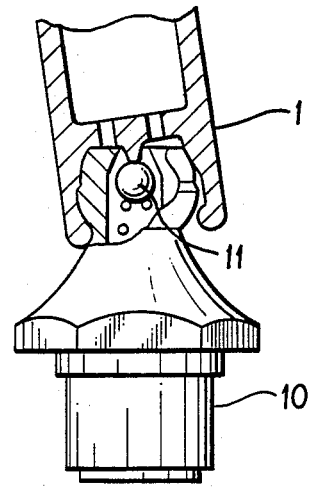
FIGS. 4 and 5 are elevational perspective views of the second embodiment, wherein the adapter is partially cut away to show the pin and the ball of the lubrication fitting.
Figure 5:
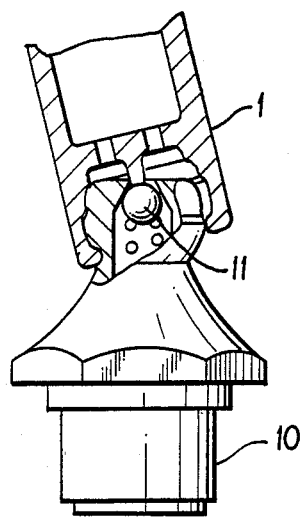

According to the sectional view shown in FIG. 1 a first embodiment of the adapter has a generally tubular body 1. In FIG. 1 there is shown only the top end of the adapter which is shaped and dimensioned to removably receive the output port of a lubrication fitting 10 which, e.g., is shown in FIG. 4 and 5. Near the top end there is mounted a separating disc 2 to the tubular body 1. The separating disc 2 is provided with a plurality of openings 4 which are located around a central pin 3, as can be best seen from FIG. 2 in which four openings 4 are shown. The diameter of the pin 3 is smaller, preferably one half of the diameter of the opening of the lubrication fitting. The top end of the pin 3 is rounded, thereby allowing the restrictor of the lubrication fitting 10 to be opened from any angle. Moreover, the lateral forces during the engaging of the adapter are reduced, by which a possible breaking of the pin 3 can be avoided.

Between the top end of the tubular body 1 and the separating disc 2 is formed an annular shoulder 5 such that the diameter of the tubular body 1 is conically decreasing from the top end thereof to the separating disc 2. Depending on the form and the dimension of the lubrication fitting the dimension and the slope of the shoulder 5 is designed such that it prevents the fluid from flowing past the lubrication fitting 10. Furthermore the shoulder 5 is defining the distance which the flow restrictor of the lubrication fitting is moved. It has been found that the slope of the shoulder 5 is preferably 60° with a surface area long enough to maintain a seal up to a 15° to a 20° angle between the adapter and the head of the lubrication fitting 10.

Figure 2:
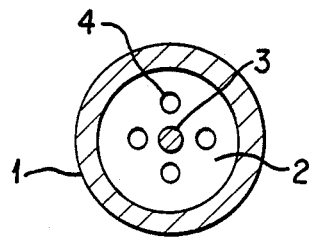
FIG. 2 is a top plan view of the first embodiment.
Figure 3:
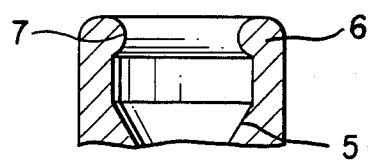
FIG. 3 is a sectional view of a second embodiment of the adapter.

In FIG. 3 there is shown only the most upper part of a second embodiment of the adapter according to the present invention, the parts which are not shown being identical to the corresponding parts of the first embodiment shown in FIG. 1 and 2. This second embodiment differs from the first embodiment in that the most top end of the tubular body 1 is shaped and designed to receive a lubrication fitting which, as the lubrication fitting shown in FIG. 4 and 5, has a ball-shaped head. By means of an appropriately designed annular angle stop 7 it is achieved that the angular movement between the adapter and the head of the lubrication fitting 10 is limited. It has been found that it is advantageous to limit the angular movement to approximately 15° to 20°.

According to FIG. 3 the top end 6 of the tubular body 1 is designed such that the ball-shaped head of the lubrication fitting 10 is received in a snap-fit manner. By this the adapter is more securely connected to the lubrication fitting 10. In this case the angle stop 7 has the effect to disengage the adapter from the lubrication fitting at the above mentioned angle of preferably 15° to 20°.

In the following the operation of the adapter will be described in detail with reference to FIG. 4 and 5 in which, by way of example, is shown the adapter according to the second embodiment connected to a lubrication fitting 10. The lubrication fitting 10 includes a flow restrictor in the form of a ball 11 which is biased to a closed position by means of a helical spring indicated by several points. To lubricate a bearing, on which the lubrication fitting 10 is mounted, it is necessary to move the ball 11 from this closed position to an open position so that grease or another lubrication fluid can flow through the fitting 10 onto the bearing which must be greased or lubricated from time to time in order to work efficiently.

As can be seen from FIG. 4 the adapter is connected to the lubrication fitting 10 by snap-fitting it onto the ball-shaped head of the lubrication fitting 10. By this the rounded top end of the tip 3 is engaging the ball 11 and forces it against the biasing of the spring a certain distance into the inner of the opening of the fitting 10.

The opening of the fitting 10 hence is opened, so that the grease can flow through the the openings 4 into the fitting, thereby greasing the bearing. The distance by which the ball 11 is moved is defined by the dimension of the shoulder 5, as has already been described. By being pressed against the upper surface of the ball 11 the shoulder 5 moreover hinders the grease which is flowing through the openings 4 from flowing to the outside.

In FIG. 4 the adapter is shown being connected to the lubrication fitting at an angle of about 5°, whereas in FIG. 5 the angle is about 15°.

Figure 6:
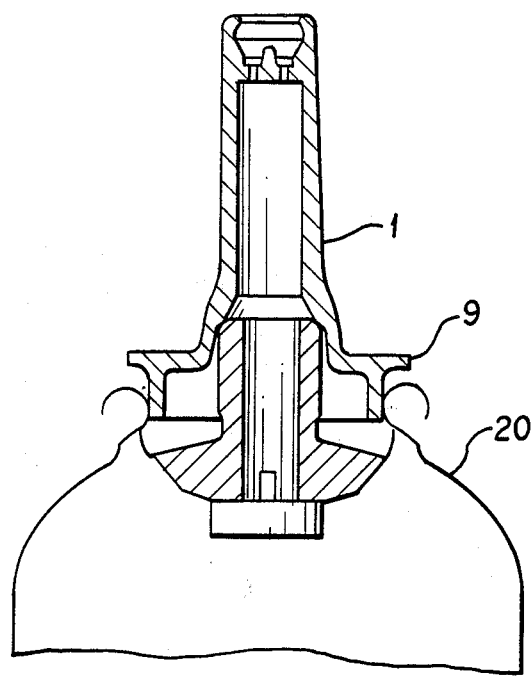
FIG. 6 shows the adapter being mounted on a dispensating apparatus.

According to the schematic illustration in FIG. 6, in some cases it is advantageous to use the adapter with a dispensating apparatus 20 which is containing the grease. The apparatus 20 is placed into its lubricating position for example by pressing down on a valve in an axial direction. In this situation, it is preferable to provide the adapter with an annular projection 9 near the bottom end of the tubular body. This projection 9 acts as a stop to restrict downward motion of the valve of the adapter during the dispensing of grease from the container of the apparatus 20. The outer surface of the bottom end of the tubular body is designed such that the adapter is insertable in an opening of the dispensating apparatus 20.

This type of dispensating apparatus is preferably used when a large number of lubrication fittings positioned at eye level are to be lubricated. In this situation, there will be used the first embodiment of the adapter as shown in FIG. 1 which is not snapped onto the head of the lubrication fitting.

In other cases, for example when lubricating the bearings of cars, it may be preferable to use the second embodiment of the adapter which is snapped on to the lubrication fitting. In that case the grease flow will not be activated by pushing straight on the valve but rather will be activated in the following manner: the adapter is slipped on to the lubrication fitting 10 holding the ball 11 in its open position without a continuous force being applied by the operator. The grease dispensating apparatus 20 can then be operated from a locate location being connected to the adapter by a hose (not shown).

According to the present invention, the person who is lubricating the bearing will be able to easily move the ball 11 from its normally closed position to its open position by means of the pin 3 of the adapter. While the pin 3 is holding the ball 11 in its open position the grease can easily be dispensed onto the bearing through the fitting 10. By this it is not necessary to unseat the ball by the pressure of exaggerated by the dispensating apparatus 20. In fact, the pressure which is necessary to do so is so high that a lot of dispensating apparatuses will not be able to open the ball 11 without the adapter according to the present invention.

In a typical fitting, the diameter of the opening is about 1.58 mm and the diameter of the ball 11 is somewhat greater. The diameter of the pin 3, consequently, is about 0.75 mm. The ball 11 is moved by the pin 3 for about 0.5 mm.

The adapter can be made of any rigid material which offers enough strength. The material preferably used for the adapter is acetal plastic. It furthermore is possible to use aluminum or any other rigid metal like high chrome steel (music wire) or plastic.

The adapter preferably is made as one-piece. It, however, is possible to make the adapter in two or more pieces, where the pin 3 is made separately and combined with the other part or parts.

I claim:

1. An adapter for use with a lubrication fitting of the type which includes a flow restrictor normally biased to a closed position to restrict the flow of fluid, the adapter comprising a generally tubular body having a top end and a bottom end, said top end of said tubular body being shaped and dimensioned to removably receive the output port of said lubrication fitting and a pin centrally positioned in said tubular body proximate said top end thereof, said pin being adapted to enter an opening of said lubrication fitting to move said flow restrictor from its normally closed position to an open position in which fluid can flow characterized in that the diameter of said pin (3) is smaller than the diameter of the opening of said lubrication fitting (10), and in that said pin is fixed to a separating disc (2) which is secured in a fixed position to said tubular body (1) and is provided with a plurality of openings (4) for allowing said fluid to flow into said lubrication fitting.

2. The adapter of claim 1 wherein the top end of said pin (3) is rounded.

3. The adapter of claim 1 wherein characterized in that between said top end and said separating disc (2) of said tubular body (1) is formed an annular shoulder (5), said shoulder being such that it prevents said fluid from flowing past said lubrication fitting (10) and that it acts as a stop defining a distance which said flow restrictor (11) is moved.

4. The adapter of claim 1 wherein said top end of said tubular body (1) is shaped and designed to receive a ball-shaped head of said lubrication fitting (10) while allowing a restricted angular movement between said lubrication fitting (10) and said tubular body (1).

5. The adapter of claim 1 wherein said top end of said tubular body (1) is designed such that said ball-shaped head of said lubrication fitting (10) is received in a snap-fit manner.

6. The adapter of claim 1 wherein said top end of said tubular body (1) includes an angle stop (7) proximate said top end to limit angular movement of said adapter and said lubrication fitting (10).

7. An adapter according to claim 6, characterized in that said angle stop (7) is designed such that said lubrication fitting (10) is disengaged when the angle between it and said adapter is greater than 15° to 20°.

8. The adapter of claim 6 wherein the slope of said shoulder (5) is approximately 60° with a surface area long enough to maintain a seal up to a 15° to 20° angle between said lubrication fitting (10) and said tubular body (1).

9. The adapter of claim 1 wherein the diameter of said pin (3) is about half of the diameter of said opening of said lubrication fitting (10).

10. The adapter of claim 1 wherein said bottom end of said tubular body (1) comprises an annular projection (9) capable of acting as a stop to restrict motion of said adapter when it is connected to a dispensating apparatus (20), the outer surface of said bottom end being designed to be insertable into an opening of said dispensating apparatus.

11. The adapter of claim 1 wherein the adapter is made of acetal plastic.

12. The adapter of claim 1 wherein the adapter is made as one-piece.

* * * * *